United States Patent
Walker

(10) Patent No.: US 8,468,165 B2
(45) Date of Patent: Jun. 18, 2013

(54) METHOD FOR DISCOVERING NETWORK OF HOME OR BUILDING CONTROL DEVICES

(75) Inventor: Chris D. Walker, New York, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 666 days.

(21) Appl. No.: 12/326,502

(22) Filed: Dec. 2, 2008

(65) Prior Publication Data

US 2009/0150356 A1 Jun. 11, 2009

Related U.S. Application Data

(60) Provisional application No. 60/991,747, filed on Dec. 2, 2007.

(51) Int. Cl.
G06F 7/00 (2006.01)
G06F 17/30 (2006.01)

(52) U.S. Cl.
USPC ............ 707/769; 707/782; 709/204; 709/224

(58) Field of Classification Search
USPC ....................................................... 707/769
See application file for complete search history.

(56) References Cited

U.S. PATENT DOCUMENTS

| | | |
|---|---|---|
| 4,138,684 A | 2/1979 | Kerr |
| 4,334,171 A | 6/1982 | Parman et al. |
| 4,924,151 A | 5/1990 | D'Aleo et al. |
| 4,939,792 A | 7/1990 | Urbish et al. |
| 5,038,081 A | 8/1991 | Maiale, Jr. et al. |
| 5,059,871 A | 10/1991 | Pearlman et al. |
| 5,079,559 A | 1/1992 | Umetsu et al. |
| 5,101,141 A | 3/1992 | Warner et al. |
| 5,157,273 A | 10/1992 | Medendorp et al. |
| 5,191,265 A | 3/1993 | D'Aleo et al. |
| 5,225,765 A | 7/1993 | Callahan et al. |
| 5,239,205 A | 8/1993 | Hoffman et al. |
| 5,248,919 A | 9/1993 | Hanna et al. |
| 5,319,301 A | 6/1994 | Callahan et al. |
| 5,400,041 A | 3/1995 | Strickland |
| 5,430,356 A | 7/1995 | Ference et al. |
| 5,455,487 A | 10/1995 | Mix et al. |
| 5,510,679 A | 4/1996 | Maiale, Jr. et al. |

(Continued)

OTHER PUBLICATIONS

Heath/Zenith Model 6022, Wireless Outdoor Power Control, HeathCo LLC 2007.

(Continued)

*Primary Examiner* — Binh V Ho
(74) *Attorney, Agent, or Firm* — Carter, DeLuca, Farrell & Schmidt LLP

(57) ABSTRACT

The present disclosure relates to a method for discovering, identifying, and cataloguing devices on a network, particularly, devices included in a home automation or building control network. In embodiments, a node information table is populated with generic entries representing potentially-discoverable devices on the network. The table is traversed iteratively and potential devices are queried in turn to determine the type and capabilities of each potential device in the network. Device responses stored in the node information table, replacing generic entries with updated entries representative of actual network devices. Additionally, device responses may be used as a basis for subsequent queries to network devices. After device queries are completed, any remaining generic node information table entries are removed from the table, thereby only entries corresponding to positively-identified network devices remain in the table.

12 Claims, 6 Drawing Sheets

U.S. PATENT DOCUMENTS

| | | | |
|---|---|---|---|
| 5,530,322 | A | 6/1996 | Ference et al. |
| 5,598,042 | A | 1/1997 | Mix et al. |
| 5,736,965 | A | 4/1998 | Mosebrook et al. |
| 5,748,466 | A | 5/1998 | McGivern et al. |
| 5,867,127 | A | 2/1999 | Black et al. |
| 5,898,407 | A | 4/1999 | Paulus et al. |
| 5,905,442 | A | 5/1999 | Mosebrook et al. |
| 5,982,103 | A | 11/1999 | Mosebrook et al. |
| 6,046,550 | A | 4/2000 | Ference et al. |
| 6,091,205 | A | 7/2000 | Newman, Jr. et al. |
| 6,211,626 | B1 | 4/2001 | Lys et al. |
| 6,233,618 | B1* | 5/2001 | Shannon ............ 709/229 |
| 6,297,724 | B1 | 10/2001 | Bryans et al. |
| 6,340,868 | B1 | 1/2002 | Lys et al. |
| 6,347,028 | B1 | 2/2002 | Hausman, Jr. et al. |
| 6,369,524 | B1 | 4/2002 | Sid |
| 6,380,692 | B1 | 4/2002 | Newman, Jr. et al. |
| 6,418,324 | B1 | 7/2002 | Doviak et al. |
| 6,427,170 | B1* | 7/2002 | Sitaraman et al. ......... 709/226 |
| 6,459,919 | B1 | 10/2002 | Lys et al. |
| 6,469,457 | B2 | 10/2002 | Callahan |
| 6,496,859 | B2* | 12/2002 | Roy et al. ............ 709/223 |
| 6,507,158 | B1 | 1/2003 | Wang |
| 6,528,957 | B1 | 3/2003 | Luchaco |
| 6,703,786 | B2 | 3/2004 | Tannenbaum |
| 6,756,998 | B1 | 6/2004 | Bilger |
| 6,761,470 | B2 | 7/2004 | Sid |
| 6,798,341 | B1 | 9/2004 | Eckel et al. |
| 6,901,439 | B1 | 5/2005 | Bonasia et al. |
| 6,909,921 | B1 | 6/2005 | Bilger |
| 6,917,167 | B2 | 7/2005 | Courtney et al. |
| 6,940,230 | B2 | 9/2005 | Myron et al. |
| 6,993,417 | B2 | 1/2006 | Osann, Jr. |
| 7,027,416 | B1 | 4/2006 | Kriz |
| 7,038,910 | B1 | 5/2006 | Hodge et al. |
| 7,071,634 | B2 | 7/2006 | Johnson et al. |
| 7,106,261 | B2 | 9/2006 | Nagel et al. |
| 7,123,139 | B2 | 10/2006 | Sweeney |
| 7,164,238 | B2 | 1/2007 | Kazanov et al. |
| 7,166,970 | B2 | 1/2007 | Johnson et al. |
| 7,219,141 | B2 | 5/2007 | Bonasia et al. |
| 7,230,532 | B2 | 6/2007 | Albsmeier et al. |
| 7,412,237 | B2* | 8/2008 | Takahashi et al. ......... 455/432.3 |
| 7,415,310 | B2 | 8/2008 | Bovee et al. |
| 7,477,920 | B2 | 1/2009 | Scheinert et al. |
| 7,570,166 | B2 | 8/2009 | Alden et al. |
| 7,649,866 | B2* | 1/2010 | Chari et al. ............ 370/331 |
| 2001/0015862 | A1 | 8/2001 | Lynam et al. |
| 2002/0124079 | A1* | 9/2002 | Pulsipher ............ 709/224 |
| 2002/0176366 | A1* | 11/2002 | Ayyagari et al. ............ 370/245 |
| 2002/0188759 | A1* | 12/2002 | Roy et al. ............ 709/245 |
| 2003/0076281 | A1 | 4/2003 | Morgan et al. |
| 2003/0163583 | A1* | 8/2003 | Tarr ............ 709/245 |
| 2003/0202512 | A1* | 10/2003 | Kennedy ............ 370/389 |
| 2003/0233129 | A1 | 12/2003 | Matos |
| 2004/0002792 | A1 | 1/2004 | Hoffknecht |
| 2004/0212324 | A1 | 10/2004 | Callaghan |
| 2004/0264395 | A1* | 12/2004 | Rao ............ 370/311 |
| 2005/0025496 | A1 | 2/2005 | Akita et al. |
| 2005/0030177 | A1 | 2/2005 | Albsmeier et al. |
| 2005/0043907 | A1 | 2/2005 | Eckel et al. |
| 2005/0125083 | A1 | 6/2005 | Kiko |
| 2005/0248300 | A1 | 11/2005 | Walko, Jr. et al. |
| 2005/0280598 | A1 | 12/2005 | Webb et al. |
| 2006/0049935 | A1 | 3/2006 | Giannopoulos et al. |
| 2006/0072707 | A1* | 4/2006 | Araujo et al. ............ 379/1.01 |
| 2006/0094427 | A1* | 5/2006 | Buckley et al. ............ 455/434 |
| 2006/0142034 | A1 | 6/2006 | Wentink et al. ............ 455/515 |
| 2006/0264227 | A1* | 11/2006 | Takahashi et al. ............ 455/513 |
| 2006/0279236 | A1 | 12/2006 | Johnson et al. |
| 2007/0075852 | A1 | 4/2007 | Schmidt et al. |
| 2007/0162536 | A1 | 7/2007 | Ostrovsky et al. |
| 2007/0222584 | A1 | 9/2007 | Albsmeier et al. |
| 2007/0222588 | A1* | 9/2007 | Wolfe ............ 340/539.13 |
| 2008/0031208 | A1* | 2/2008 | Abhishek et al. ............ 370/338 |
| 2008/0066157 | A1* | 3/2008 | Stevens et al. ............ 726/4 |
| 2008/0094210 | A1 | 4/2008 | Paradiso et al. |
| 2008/0237010 | A1 | 10/2008 | Patel et al. |
| 2008/0291843 | A1* | 11/2008 | Sonnenberg et al. ......... 370/254 |
| 2008/0303661 | A1 | 12/2008 | Chick |
| 2010/0115067 | A1* | 5/2010 | Brant et al. ............ 709/221 |

OTHER PUBLICATIONS

Klipsch, Light Speaker, Owner's Manual and Installation Instructions, www.klipsch.com, Rev. D, Nov. 2009.

Lutron Electronics, New Occupancy/Vacancy Sensor Sets a Higher Performance Standard, www.lutron.com/news/, Coopersburg, PA, Jun. 2009.

Black, Lutron RF Technology, Relilable. First. Forward Thinking, Lutron Elec. Co., Inc., www.lutron.com (Aug. 2006).

Acoustic Research, News Release, Acoustic Research Accessories Announces Zentral Home Command Smartphone Remotes, Audiovox Corp., Las Vegas (Jan. 2010), www.araccessories.com.

* cited by examiner

METHOD FOR DISCOVERING NETWORK OF HOME OR BUILDING CONTROL DEVICES

CROSS-REFERENCE TO RELATED APPLICATION

This application claims priority to U.S. Provisional Application Ser. No. 60/991,747, filed Dec. 2, 2007, the entirety of which is hereby incorporated by reference herein for all purposes.

BACKGROUND

1. Technical Field

The present disclosure relates to the field of home automation and building control systems, and more particularly, to a method of discovering and mapping a home or building control network without prior knowledge of the topology or member devices thereof.

2. Background of Related Art

Home automation and building control systems (hereinafter collectively referred to as home automation systems) provide control and monitoring of electrical and electromechanical devices commonly found within a building, such as a residence or commercial building. An example of a simple home automation system may include a familiar wall-mounted light switch that includes remote-control capability, and a corresponding remote controller that communicates with the switch. A user may then enjoy the convenience of controlling room lighting while relaxing on the sofa, or while lying in bed. A more sophisticated system may include software executing on, for example, a personal computer or dedicated device, in operable communication with a wide variety of sensors, devices and controllers installed throughout the building. Such a system may include the capability to control lighting on a schedule or in response to sensor inputs; to monitor environmental conditions such as temperature and humidity and in response thereto control heating, ventilation, and air conditioning (HVAC) systems accordingly; to coordinate and monitor security devices such as perimeter intrusion detectors, motion detectors, and surveillance cameras; to facilitate the distribution of digital media; to monitor and control convenience and recreation systems, such as irrigation systems (e.g., in-ground sprinklers), garage door openers, pool and spa filtration and heating systems; and to monitor and control other aspects of the home environment (i.e., basement flood detection, refrigerator-freezer temperatures, loss of utility grid power, and the like).

Examples of home automation devices capable of receiving and/or transmitting home automation commands and/or data include, without limitation, dimmers and switches, remote-controlled outlets, handheld devices, HVAC thermostats, furnaces, air conditioning units, appliances, control panels, display devices, wired and wireless remote controls, motion sensors, blind and drape motors, energy management devices, system controllers, home entertainment systems, access control devices, interfaces, and personal computers.

A home automation system may provide access to selected features from outside the home. In one example, a telephone interface may be provided wherein the homeowner can dial into the home automation system, authenticate to gain remote access to the system (i.e., enter a predetermined PIN code or password), and access system functions using, for example, voice menus, and spoken or touch-tone responses. More recently, home automation systems that are configured to provide access thereto via the internet to personal computers and wireless devices, such as mobile telephones and smart phones, have become popular.

Some means of communication between home automation system devices must be provided in order for a home automation system to function. For example, early home automation systems employed hard wiring to interconnect system devices, e.g., system devices are interconnected with cables routed through the building structure. While technically simple to implement, hard wired home automation systems may have disadvantages. Installing the interconnection cable may require an electrician to snake wires through existing walls, floors, and ceilings, a laborious and costly undertaking. Additionally, after devices have been installed at one location, they are not easily moved to a different location unless existing cables are rerouted or additional cables are run. Furthermore, the cost of copper and thus cabling has risen markedly in recent years, thereby significantly adding to the cost of hardwired systems. Hardwired systems also tend to be proprietary in nature whereby components from one manufacturer are incompatible with devices from another manufacturer, which limits consumer choice and increases costs.

Techniques have been developed whereby home automation modules communicate using signals transmitted over existing electrical (e.g., "mains") wiring. These techniques, known as powerline carrier signals, operate by transmitting a modulated data signal that is superimposed on the 60 Hz or 50 Hz alternating current line voltage typically supplied by the utility grid. One popular standard for powerline carrier communications is the X10® protocol, which encodes data in 120 kHz bursts synchronized to zero crossings of the 60 Hz or 50 Hz power line current. While X10® provides certain benefits, such as ease of use, interoperability among devices of different manufacturers, and relatively low cost, it may have drawbacks in that signal propagation throughout a building may be compromised by many factors which impairs reliability of the system. For example, an X10® signal may not effectively bridge between phases of an electrical service panel without the installation of a specific X10® phase coupler. X10®™ signals are also susceptible to interference causing spurious activation, deactivation, and malfunction of system devices. In addition, an X10® signal may not propagate well through ground fault circuit interrupter (GFCI) devices, and may be disrupted by switching power supplies commonly found in personal computers and other modern electronic devices.

Recent advances in wireless networking have enabled the development of home automation communications standards and associated devices with improved reliability and an expanded feature set. Once such standard is the Z-Wave® protocol promulgated by Zen-Sys, Inc. of Fremont, Calif., which defines a wireless mesh networking protocol for home automation. In a Z-Wave® home automation system, each device is a node on a wireless mesh network that can communicate with other network nodes either directly or through the mesh network structure. That is, if two nodes are capable of direct RF communication (e.g., physically located no more than about 30 meters apart without obstructions) a message may be passed directly therebetween. If, however, the nodes are unable to communicate directly (e.g., beyond direct RF communication range or if the signal is sufficiently attenuated by an obstruction), the network will attempt to forward messages from the sending node to the receiving node via successive intervening nodes. A Z-Wave® network includes a routing table describing the network topology which facilitates calculation of routes on the basis thereof. The routing table includes a list of nodes comprising the network, and for each, a list of neighbor nodes that are in direct RF communication range therewith. Using the routing table, it is possible to determine a route by which a message may be delivered from sender to receiver. The routing process ensures that all destination nodes can be reached from any initiator node.

The Z-Wave® protocol defines three fundamental types of network nodes: controllers, routing slaves, and slaves. A controller can host a routing table for the entire network, calculate routes based upon the routing table, and download routes to slave nodes. One controller is designated as a primary controller which has the authority to include newly-added nodes to, or exclude undesired nodes from, the network. In contrast, a slave node does not contain a routing table, however, a routing slave can contain a number of pre-configured routes assigned by a controller. Any of a controller, routing slave, and slave may act as a repeater for messages destined for other nodes. The Z-Wave® protocol includes a unique identifier called a Home ID to distinguish separate networks from each other, and a unique identifier called a Node ID to address individual nodes in the network.

A Z-Wave® network is self-organizing whereby nodes are capable of discovering their neighbors and distributing this information to other nodes automatically when a new node is added to the network, or, alternatively, upon request. In addition, a Z-Wave® network is self-healing in that nodes are capable of redirecting network traffic if regions of the mesh become inaccessible. Although a Z-Wave® network may be installed and expanded without requiring the user/homeowner to be involved with intricate details of network management, such automatic configuration extends primarily to the initial configuration and/or installation of Z-Wave® devices. Other aspects of the home automation system, for example, the identification of modules post-installation, requires the user to manually disassociate and re-associate device nodes within the home network. In large networks this may be a tedious and time-consuming task.

SUMMARY

The present disclosure provides a method wherein a network of home or building control devices can be discovered. The presently disclosed method may advantageously use, but does not require, advance knowledge of the devices or network topology. In embodiments, the method may discover wired and wireless networks of home or building control devices. In embodiments, the method may discover static wireless repeater networks of home or building control devices. The presently disclosed method may accept an input of a network identification code to discover only devices on a specified network.

The disclosed method includes at least one of the following steps: (a) initialization of data table entries for control devices; (b) filling of data tables with generic entries; (c) requests from control devices for specific data to replace generic entries; (d) completing missing data by requesting additional product-specific data from control devices and referencing that data in a table to find complete data; and (e) removal of generic entries for non-existing, undiscoverable or undiscovered devices.

In embodiments, discovered devices may communicate with additional potentially discoverable devices and accordingly, the disclosed method may iteratively perform steps using discovered devices as repeaters or routing nodes to other devices in an effort to ensure that all devices in the network are discovered. In embodiments, a command may be issued to a device, such as without limitation, a command to activate, to deactivate, and/or to request information from the device.

In embodiments, the disclosed method discovers a network of devices utilizing the Z-Wave® mesh networking protocol. A network identification code (HOME_ID) may be used to select a particular network of devices to be discovered. A table of entries (NODEINFO table) is provided which includes an entry (NODEINFO entry) for each potential device in the network. Each NODEINFO entry includes information relating to the corresponding device, such as without limitation, the type and capabilities of the device. A NODEINFO request is a device information request sent to a device to directly populate a NODEINFO entry. In embodiments, a device database that includes a priori device data is provided. The device database may include data relating to known network devices extant, for example without limitation, data on all known Z-Wave® devices that may be commercially available at a present time.

In another aspect, the present disclosure provides method for discovering network devices that includes providing a data table, i.e., a NODEINFO table, having at least one device entry corresponding to a potentially-identifiable network device, such as a Z-Wave® device. The data table is initialized by populating the device entries with generic device data, e.g., placeholder entries. If device data is known, e.g., device data that may have previously been stored, such as without limitation a backup file, the corresponding device data entry is populated accordingly with the known data. Device data is then requested from the network device corresponding to each device entry. If the requested device data is received, the corresponding device entry is populated with the received data. If no device data is received with respect to a device entry, the device entry is nullified, indicating, for example, that no device corresponding to that device entry was discovered. In embodiments, the fact that device data was requested from a device is recorded in the device entry corresponding thereto.

In yet another aspect a home automation network is disclosed that includes at least one network device node, a home automation network interface in operable communication with the at least one network device node, and a processor operably coupled to the home automation network interface configured to execute a set of programmable instructions for performing a method of network discovery as disclosed herein.

In still another aspect, a home automation network discovery apparatus is disclosed that includes a processor, which may be operably coupled to a home automation network interface, wherein the processor is configured to execute a set of programmable instructions for performing a method of network discovery as disclosed herein.

The present disclosure also provides a computer-readable medium storing a set of programmable instructions configured for being executed by at least one processor for performing a method of discovering devices in home automation or building control network in accordance with the present disclosure.

BRIEF DESCRIPTION OF THE DRAWINGS

The above and other aspects, features, and advantages of the present disclosure will become more apparent in light of the following detailed description when taken in conjunction with the accompanying drawings wherein.

DETAILED DESCRIPTION

Particular embodiments of the present disclosure will be described hereinbelow with reference to the accompanying drawings; however, it is to be understood that the disclosed embodiments are merely exemplary of the disclosure, which may be embodied in various forms. Well-known functions or constructions are not described in detail to avoid obscuring the present disclosure in unnecessary detail. It is to be understood that the steps of the disclosed methods may be performed in a different order than presented herein. Therefore, specific structural, functional, and algorithmic details disclosed herein are not to be interpreted as limiting, but merely as a basis for the claims and as a representative basis for teaching one skilled in the art to variously employ the present disclosure in virtually any appropriately detailed structure.

Figure 1:
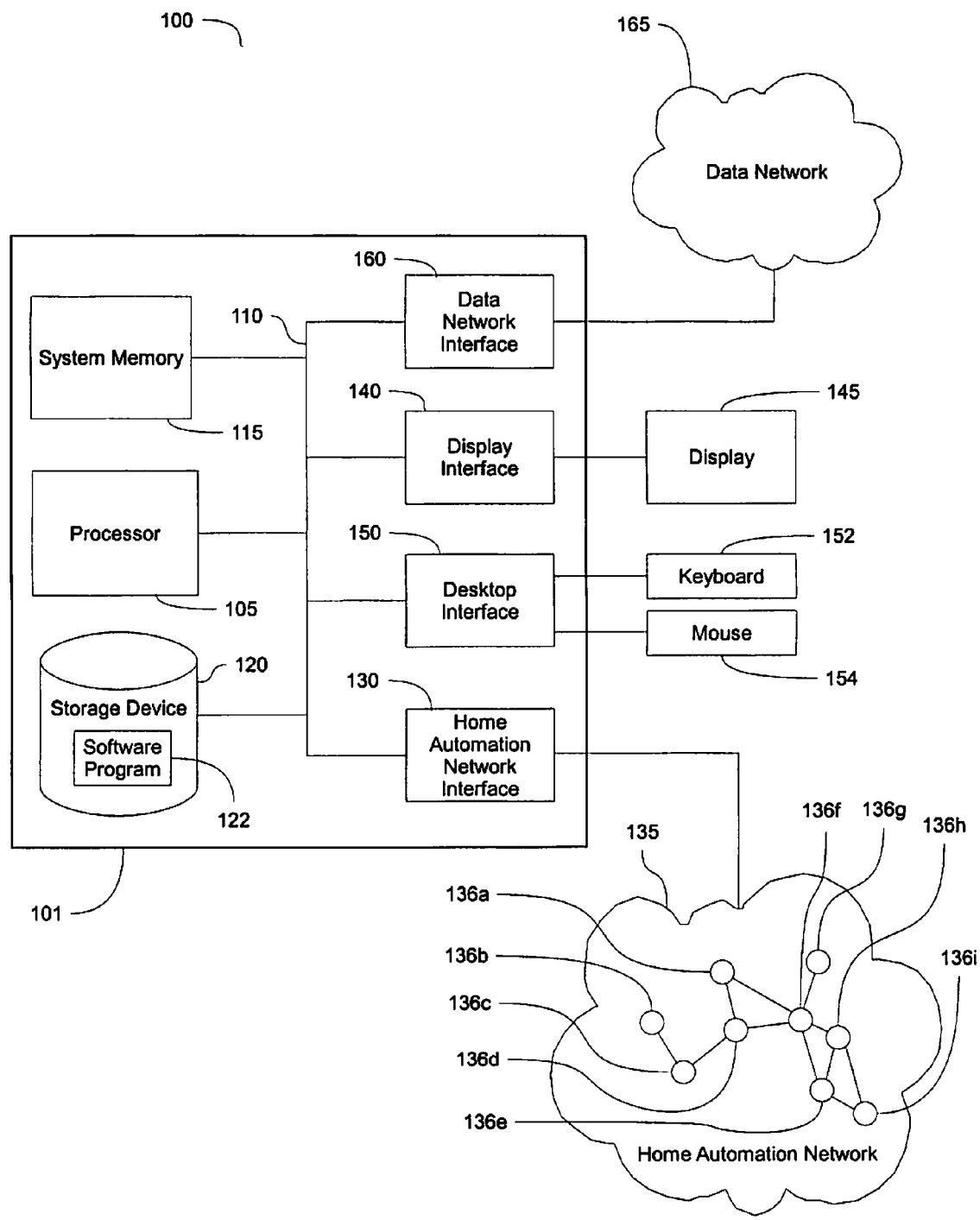
FIG. 1 is a block diagram illustrating a representative operating environment for an exemplary embodiment of a network discovery method in accordance with the present disclosure.

FIG. 1 illustrates a representative operating environment 100 for an exemplary embodiment of a method of network discovery in accordance with the present disclosure. Representative operating environment 100 includes computer 101 which can be a personal computer (PC) or a server, which further includes at least one system bus 110 which couples system components, including at least one processor 105; a system memory 115 which may include random-access memory (RAM); at least one storage device 120, such as a hard disk, CD-ROM or DVD-ROM, or other non-volatile storage device, such as without limitation a flash memory device or USB memory stick; and input-output interfaces including display interface 140, desktop interface 150 and data network interface 160. System bus 110 may be any of several types of bus structures, including a memory bus or memory controller, a peripheral bus, and/or a local bus using any bus architecture such as without limitation PCI, USB or IEEE 1394 (Firewire). Desktop interface 150 may include an AT keyboard interface, a PS/2 keyboard interface, a PS/2 mouse interface, a USB interface and/or a Bluetooth interface. Data network interface may be a wired network interface such as a 100Base-T Fast Ethernet interface, or a wireless network interface such as without limitation a wireless network interface compliant with the IEEE 802.11 (i.e., WiFi), GSM, or CDMA standard. Representative operating environment 100 includes display 145 which can be a cathode ray tube (CRT) display, liquid crystal display (LCD) or other suitable display; and input devices keyboard 152 and mouse 154.

Computer 101 may be operated in a networked environment via at least one network interface 160, wherein computer 101 is connected to remote devices by a data network 165, such as a local area network or the Internet, for the transmission and reception of data, such as without limitation accessing remote databases as will be further described herein.

Representative operating environment 100 further includes home automation network 135, which can be locally coupled to computer 101 by a home automation interface 130 such as without limitation, a ThinkStick™ Z-Wave® USB adapter. Home automation network 135 may include at least one node 136a et seq., which may be a Z-Wave®-compatible device such as a Leviton® Vizia RF® switch, dimmer, fan control, or low-voltage dimmer.

At least one software program 122 adapted to be executed on computer 101 is stored on storage device 120, or additionally or alternatively, on a remote network device such as a computer (not explicitly shown) which can be a PC, a web server, a file server, a storage array, or an application server. Software program 122 includes a set of programmable instructions configured to execute on at least one processor 105 for performing a method of discovering network nodes as disclosed herein. Software program 122 may include additional modules, routines, subroutines, objects, components, data structures, and other elements that will be familiar to the skilled artisan, that perform particular tasks. In response to commands entered into computer 101 via, for example, keyboard 152 and mouse 154, computer 101 can be caused to activate software program 122 which may be an application program. Typically, upon activation software program 122 is loaded into system memory 115 from storage device 120 or remote computer (not explicitly shown) for execution by processor 105 to allow the user to configure and interact with home automation network 135.

Figure 2:
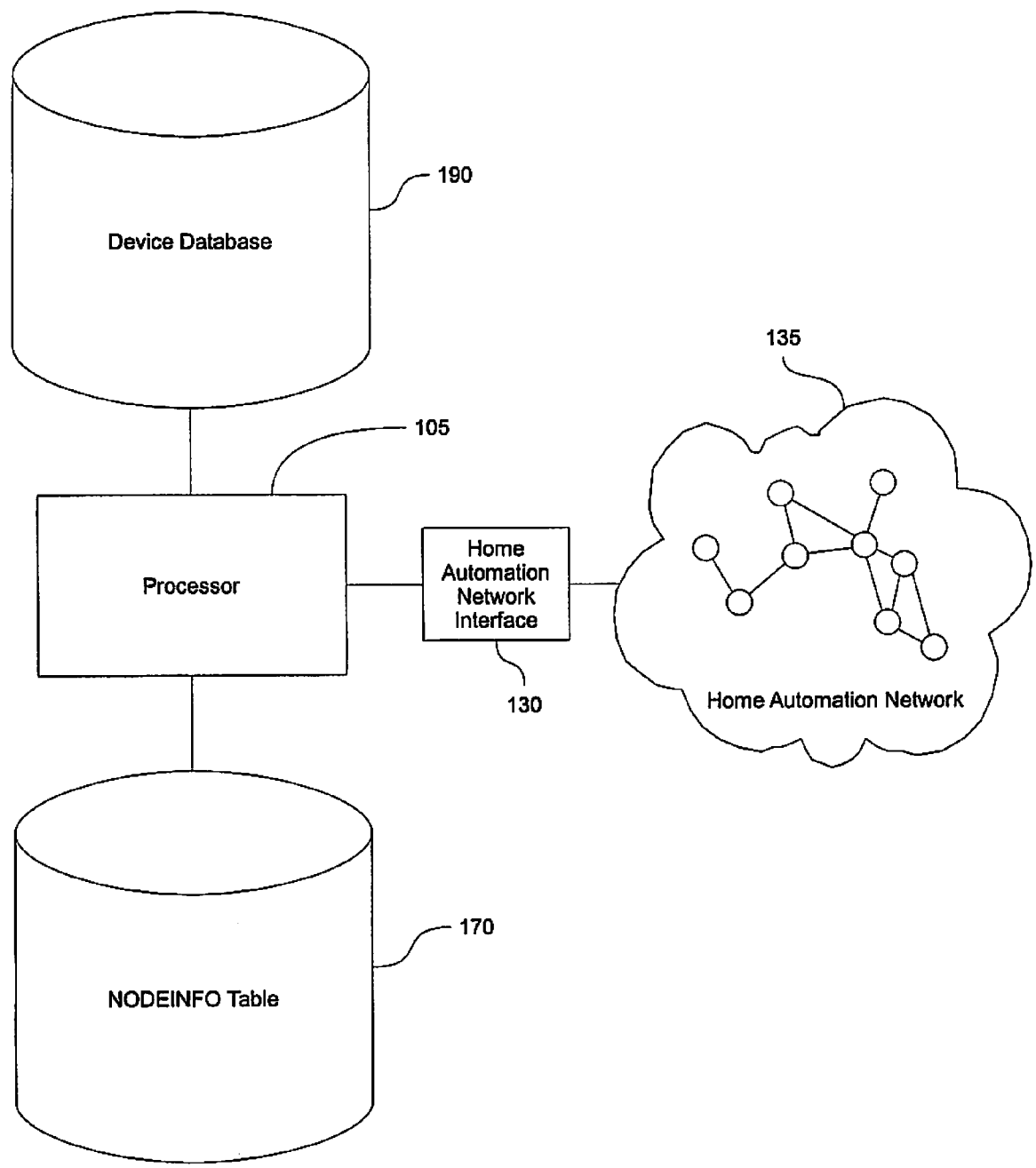
FIG. 2 is a data block diagram of an embodiment of a network discovery method in accordance with the present disclosure.
Figure 3A:
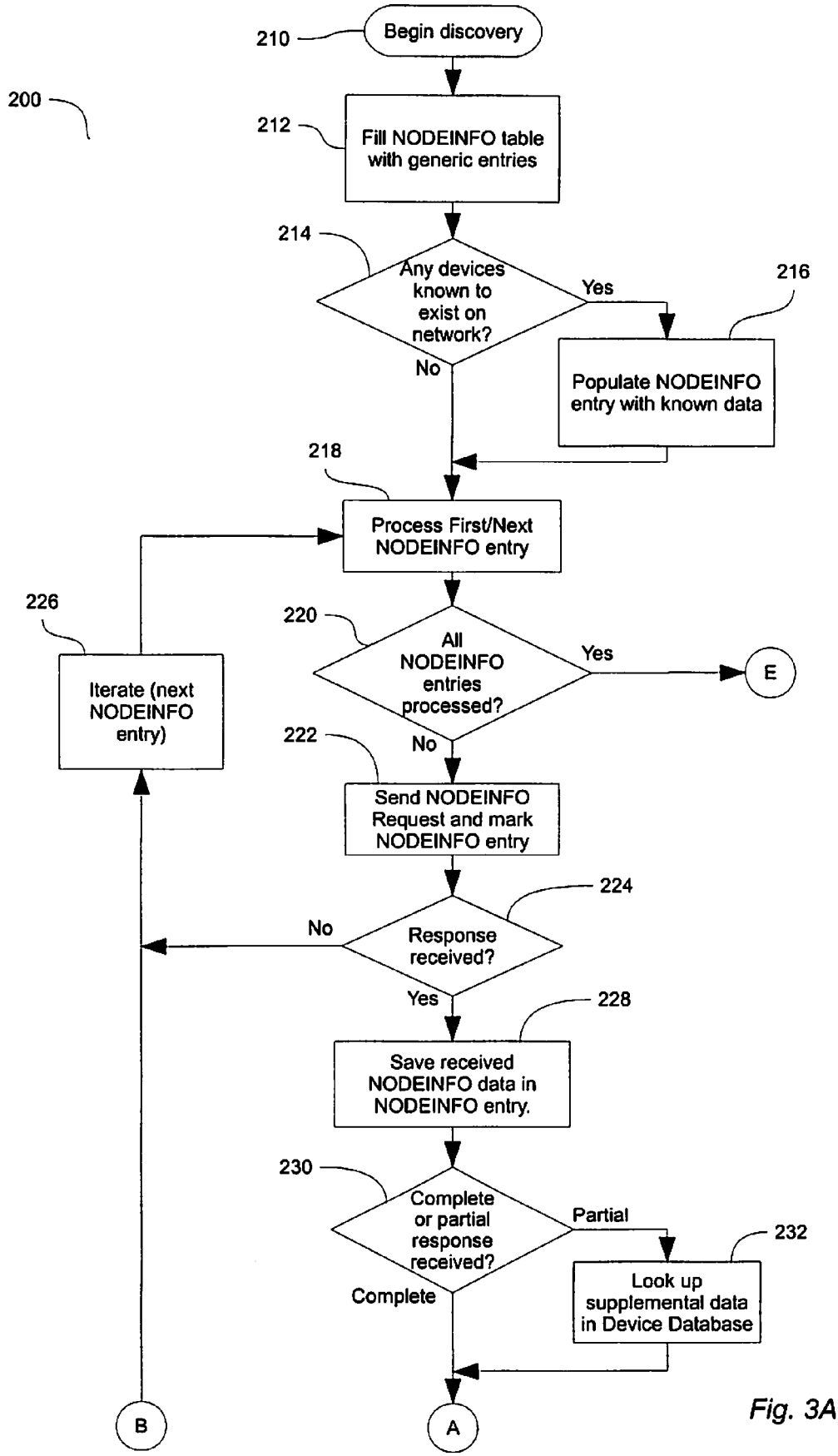
FIGS. 3A-3D are flow diagrams illustrating a method for network discovery in accordance with the present disclosure.
Figure 3B:
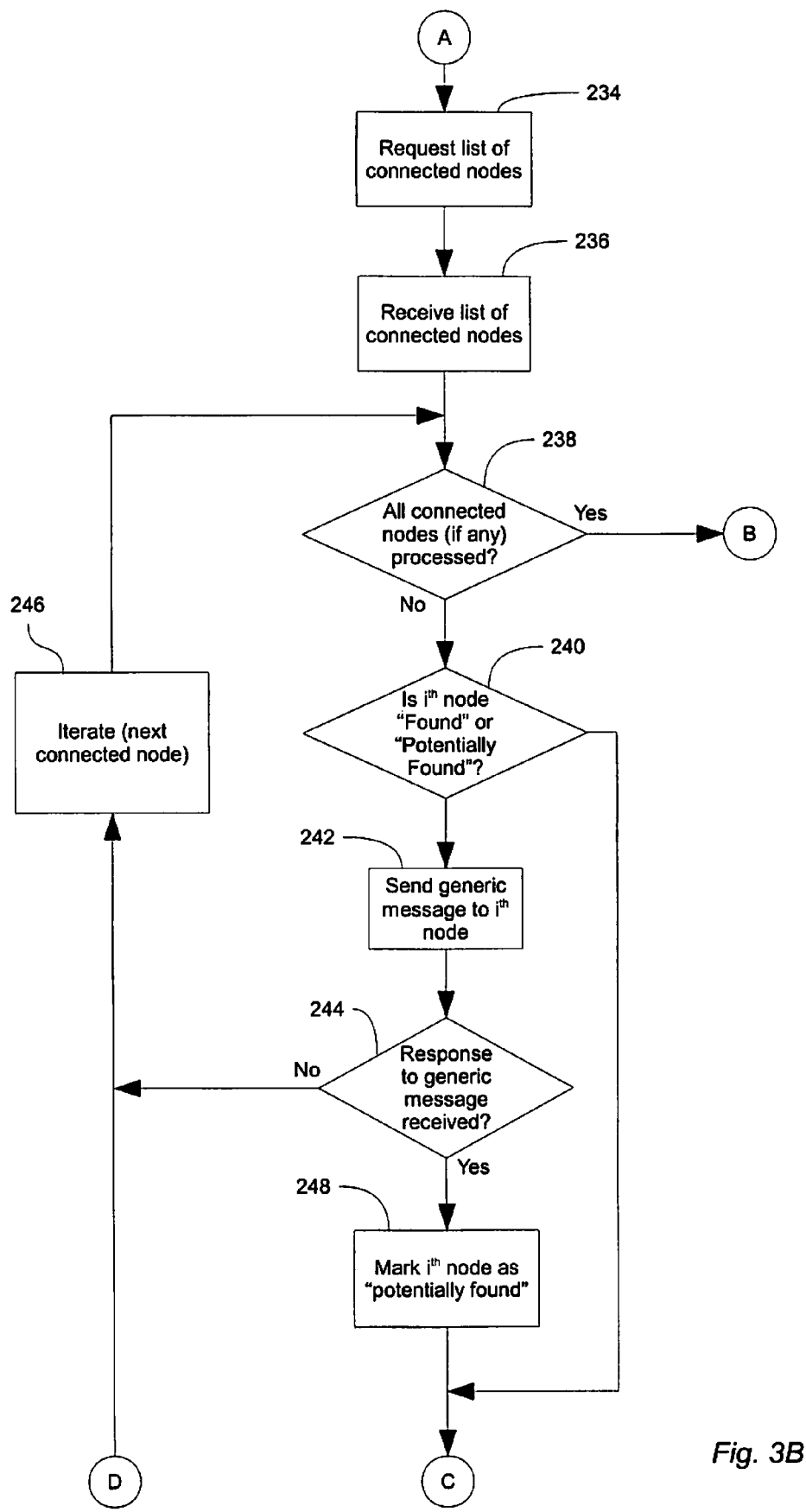
Figure 3C:
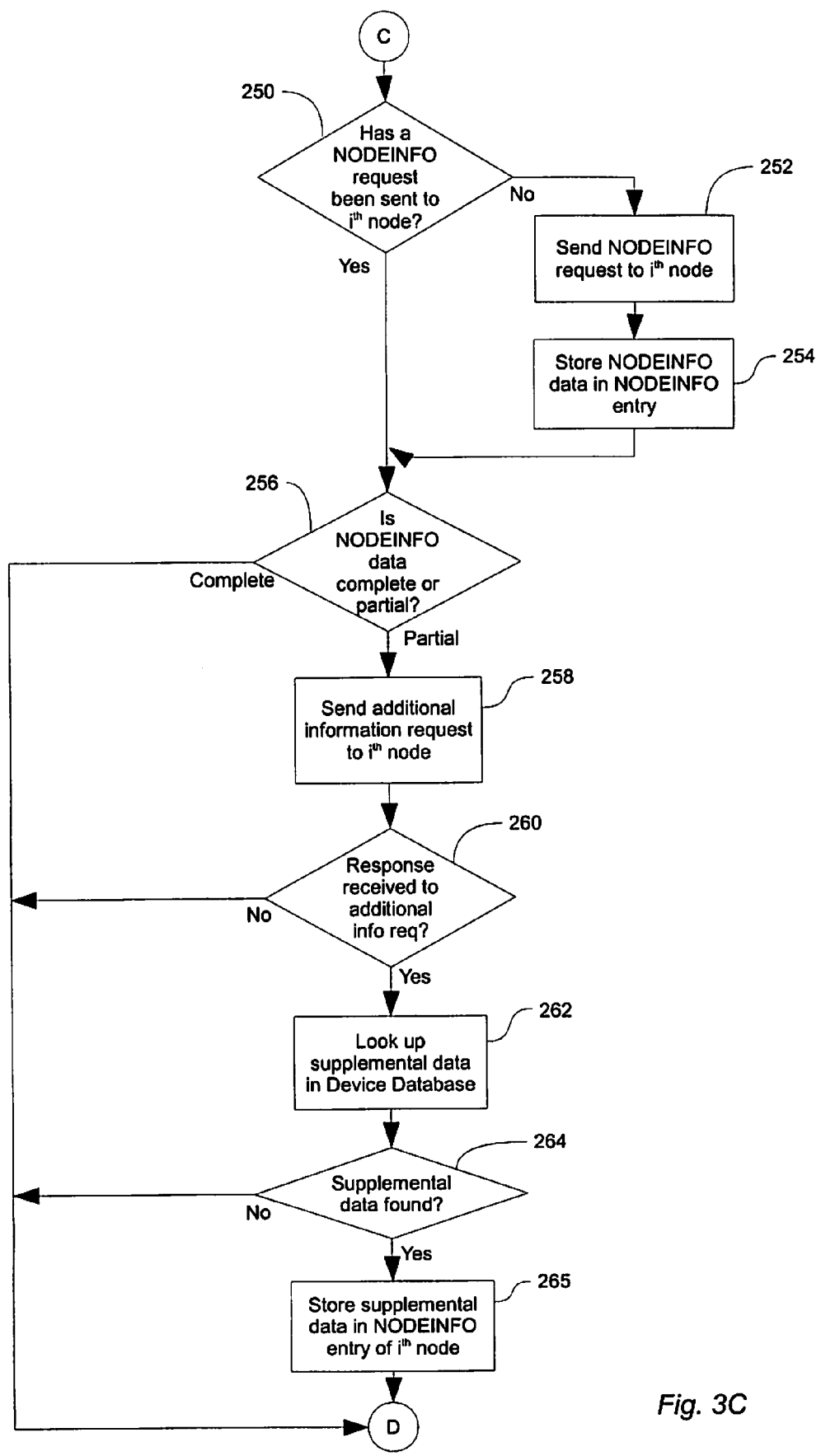
Figure 3D:
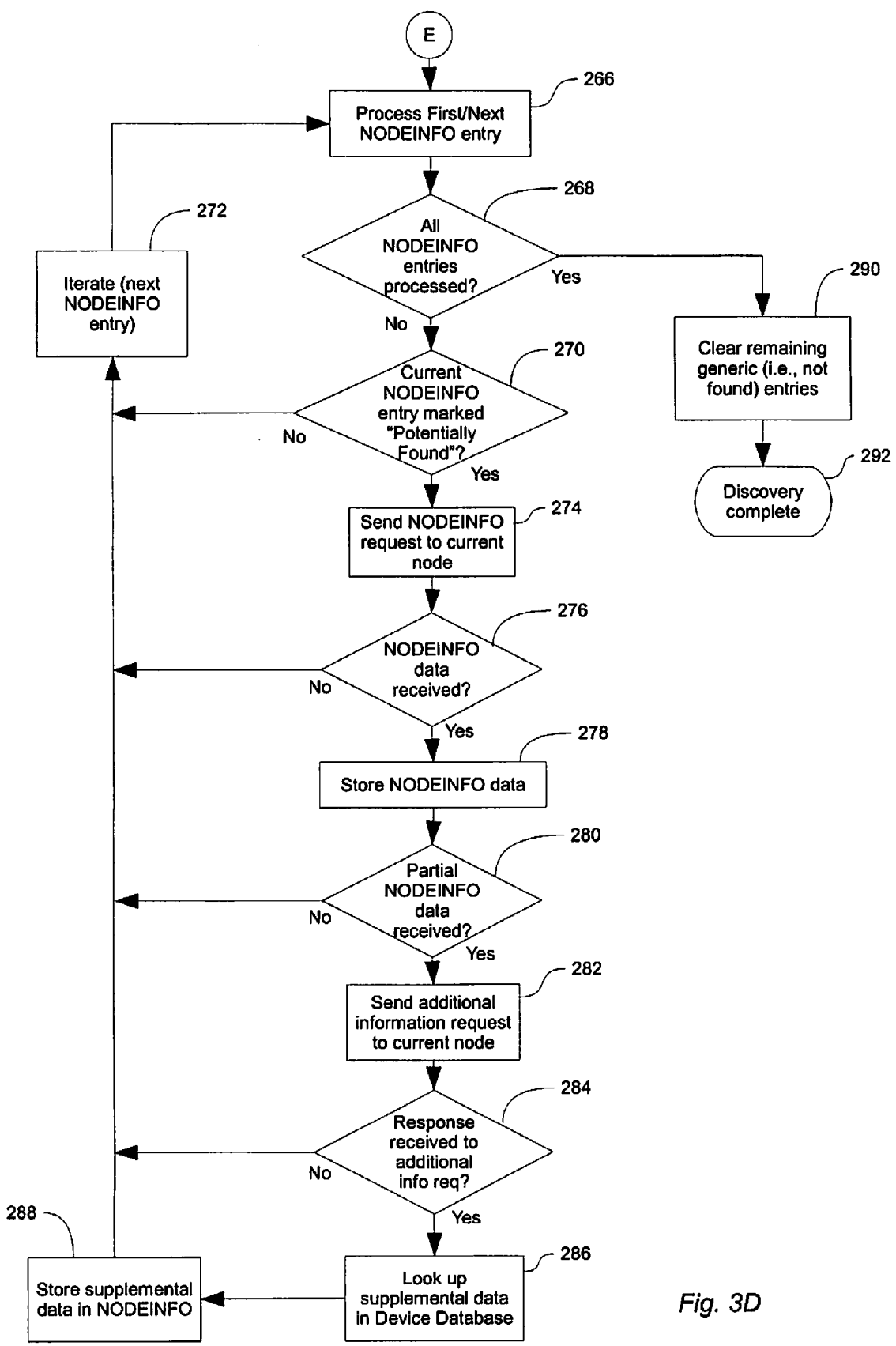

Referring now to FIG. 2, the present disclosure provides a node information table 170, (i.e., the NODEINFO table) that is configured for storing data associated with at least one node 136a et seq. (e.g., member) of the home automation network 135. In embodiments, the home automation network may be identified by an identifier associated therewith (i.e., a HOME_ID associated therewith). In embodiments, the NODEINFO table includes a number of data entries sufficient to represent the maximum number of nodes of a home automation network 135. A device database 190 is provided which includes supplemental mode data. Supplemental node data may include, but is not limited to, node data related to node type, manufacturer, device capabilities, hardware version, software version, and/or firmware version. In embodiments, device database 190 includes a priori node data. A priori node data may include data previously collected with respect to prototype or commercially-available home networking nodes. In another aspect, the device database includes data related to devices known to exist. A priori node data may be used to augment or complete information collected from the node or the network. As an example only, a given node may only provide minimal identifying information, such as a manufacturer identifier and a manufacturing date. Using such information to execute a query into the device database, the disclosed method can determine additional or supplemental information about the device. Continuing with the present example, a manufacturer identifier and a manufacturing date may be used to query the device database to determine, for example without limitation, a software version, country of origin, device capabilities, supported device profiles, and/or basic/reserved/security status. The device database may include without limitation, device capabilities (i.e., whether the device is capable of acting as a repeater node), device chipset, and/or device operating frequency. The device database may reside locally or remotely, or may be distributed among and/or between local and remote devices (i.e., servers). In embodiments, the present disclosure provides a method of populating the device database wherein an initial query for a device is performed. If the device is not found in the database, a device request may be issued to the device to obtain the device characteristics, which are added to the device database. In embodiments, the device database is accessed and update via data network, such as the internet, or other public or private data network. In embodiments, device database 190 is included with software program 122.

Turning to FIGS. 3A-3D, the disclosed method begins in the step 210, and in the step 212 populates a NODEINFO table with generic entries. A NODEINFO is associated with a potential network device, or node. A NODEINFO entry may include the NODE_ID of the device node associated therewith. In the step 214 it is determined whether at least one network device has been previously identified, e.g., whether the device(s) is/are known to be present in the network. If at least one network device has been previously identified, then in the step 216 the NODEINFO entry (or entries) associated with the at least one device(s) is populated with the known information corresponding to the device. These NODEINFO entries may consist of data representing actual potential control devices which, for example, may repeat messages in the network. Any remaining NODEINFO entries (i.e., unknown entries) are deemed potentially discoverable entries (i.e., entries which may potentially but do not yet represent a known device) and are represented by generic entries. If no devices are already known in the network, a NODEINFO table is populated with generic entries for each potential device in the network.

In the step 218 an iterative control loop (i.e., the NODEINFO loop) is established to traverse each entry in the NODEINFO table wherein in the step 220 the NODEINFO loop termination condition is tested. For each entry in the NODEINFO table, a NODEINFO request is sent to the device in the step 222 and a NODEINFO_SENT flag is set in the corresponding NODEINFO entry. In embodiments, a NODEINFO request is sent via the Z-Wave® protocol. If a NODEINFO request is responded to by the device in the step 224, the device is categorized as "found" in the step 228 wherein the NODEINFO entry associated with the current node is tagged as "found" and the received NODEINFO request data is stored in the associated a NODEINFO entry. In the step 230 it is determined whether the received NODEINFO response contains complete data, i.e., all NODEINFO response data items are populated, or the received NODEINFO request response contains partial or incomplete data, e.g., wherein one or more response data items are blank, missing, cleared, or unavailable. If the NODEINFO response contains partial data, then in the step 232 the device database 190 is queried to obtain the missing data which is then stored in the associated NODEINFO entry.

One or more connected node discovery iterations may now be performed in a connected node loop. The maximum number of iterations of this loop may be determined by the maximum number of consecutive devices which can repeat (e.g., forward) a message en route to the destination thereof. In embodiments, for example, in a Z-Wave® network, four iterations may be executed. In the step 234 a message is sent to the current node requesting a list of connected nodes, i.e., those node(s) in direct communication with the current node. A list of connected nodes is received in the step 236. In the step 238 an iterative control loop is established to traverse each entry in the list of connected nodes wherein the loop termination condition, i.e., whether all connected node have been processed, is tested. For each entry in the list of connected nodes, it is determined in the step 240 whether current connected list node (i.e., the $i^{th}$ node) has been tagged as "found" or "potentially found". If not tagged as "found" or "potentially found", in the step 242 a generic message (e.g., a "ping") is sent to the $i^{th}$ connected node. If no response to the generic message is received, the loop iterates in the step 246 and the next $i^{th}$ connected node is processed. If a response to the generic message is received, the NODEINFO entry of the $i^{th}$ connected node is marked as "potentially found".

In the step 250 it is determined whether a NODEINFO request has been sent to the $i^{th}$ device. In response to a determination that a NODEINFO request has not been sent to the $i^{th}$ device, a NODEINFO request is sent to the device in the step 252. This request may be sent directly, and also may be sent utilizing other devices as repeaters. If the NODEINFO request data is received, in the step 254 the received NODEINFO request data is stored in the associated a NODEINFO entry. In the step 256 it is determined whether the received NODEINFO response contains complete or partial data. If it is determined the received NODEINFO response contains complete data, the loop iterates in the step 246 and the next $i^{th}$ connected node is processed.

If the NODEINFO entry for the $i^{th}$ connected node is incomplete or partial, in the step 258 a request is sent to the device requesting additional information to determine the device's product type. In one implementation, the product type (e.g., MANUFACTURER_SPECIFIC data) is requested from the device; additionally, the VERSION data may be requested from the device to distinguish the device from others of the same type. In the step 260 it is determined whether such additional information was received. If it is determined additional information was not received, the loop iterates in the step 246 and the next $i^{th}$ connected node is processed. If, however, it is determined additional information was received, the step 262 is performed wherein part or all of the additional information is used to look up the complete NODEINFO entry data in the device database, and in the step 264 it is determined whether the supplemental NODEINFO data was found. If the supplemental NODEINFO data was found for the device, this complete data is stored as the NODEINFO entry for the device (i.e., the current $i^{th}$ connected node). The connected node loop iterates in the step 246 and the next $i^{th}$ connected node is processed, until all connected nodes in the current list of connected nodes have been processed. The NODEINFO loop then iterates in the step 226 and the next NODEINFO entry is processed, until it is determined in the step 220 that the NODEINFO loop has traversed all NODEINFO entries.

In the step 266 an iterative control loop (e.g., a cleanup loop) is established to traverse each entry in the NODEINFO table wherein in the step 268 the cleanup loop termination condition is tested. In the step 270 it is determined whether the current NODEINFO entry is marked "potentially found". If the current NODEINFO entry is not marked "potentially found", the cleanup loop iterates in the step 272 and the next NODEINFO entry is processed. If the current NODEINFO entry is marked "potentially found", the step 274 is executed wherein a NODEINFO request is sent to the current node and in the step 276 it is determined whether a response was received, i.e., whether NODEINFO data is received from the current node. If NODEINFO data is not received, the cleanup loop iterates in the step 272 and the next NODEINFO entry is processed. If NODEINFO data is received, in the step 278 the received NODEINFO data is stored in the current NODEINFO entry. In the step 280 it is determined whether the received NODEINFO response contains complete or partial data. If it is determined the received NODEINFO response contains complete data, the cleanup loop iterates in the step 272 and the next NODEINFO entry is processed. If the NODEINFO response contains incomplete or partial data, in the step 282 a request is sent to the device requesting additional information. In the step 284 it is determined whether such additional information was received. If it is determined additional information was not received, the cleanup loop iterates in the step 272 and the next NODEINFO node is processed. If, however, it is determined additional information was received, the step 286 is performed wherein part or all of the additional information is used to look up the complete NODEINFO entry data in the device database, and in the step 288 any supplemental NODEINFO data that was found for the device is stored as the NODEINFO entry for the device. The cleanup loop iterates in the step 272 and the next NODEINFO entry is processed, until it is determined in the step 268 all NODEINFO entries have been processed in the cleanup loop.

For each device entry which was populated with generic data, but for which no corresponding device was successfully discovered, an empty NODEINFO entry is now written in the step 290, overriding any previous NODEINFO entry for that device, removing the device as a potential device in the network. The disclosed method ends with the step 292.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. Therefore, the herein description should not be construed as limiting, but merely as exemplifications of particular embodiments. The claims can encompass embodiments in hardware, software, or a combination thereof.

What is claimed is:

1. A method for discovering one or more potentially-identifiable network devices, said method comprising the steps of:
   providing a data table having a plurality of device entries corresponding to the one or more potentially-identifiable network devices;
   initializing the data table by populating the plurality of device entries with one or more of known device data and generic device data;
   requesting a connected node list from at least a first of the one or more potentially-identifiable network devices, wherein the connected node list identifies at least one connected device node capable of communicating with said first potentially-identifiable network device;
   flagging as potentially found the device entry corresponding to the connected device node;
   requesting device data from the connected device node corresponding to the flagged device entry;
   determining whether or not a response to the device data request is received and whether the response to the device data request is complete or partial, wherein if the response to the device data request is partial, requesting and receiving additional device data from the connected device node;
   populating the flagged device entry with received device data and/or received additional device data if the response to device data request and/or additional device data request is received; and
   nullifying the flagged device entry if the response to the device data request is not received.

2. A method in accordance with claim 1, further comprising the step of providing within the flagged device entry an indication that device data was requested from the corresponding connected device node.

3. A method in accordance with claim 1, further comprising the step of providing a device database that includes a priori device data.

4. A method in accordance with claim 1, further comprising the steps of:
   providing a device database that includes a priori device data;
   determining whether the response to the device data request is complete or partial;
   responding to a determination that the response to the device data request is partial by querying the device database to obtain additional device data; and
   populating a device entry with additional device data corresponding thereto.

5. A method in accordance with claim 1, wherein the step of flagging as potentially found the device entry corresponding to the connected device node indicates that the device data request is received.

6. A method in accordance with claim 1, further comprising the following steps prior to the flagging step:
   sending a generic message to the connected device node;
   determining whether a response to the generic message is received; and
   responding to a determination that a response to the generic message was received by performing the step of flagging as potentially found the device entry corresponding to the connected device node.

7. A method in accordance with claim 6, further comprising the following steps after the flagging step and before the requesting device data step:
   determining whether device data was requested from the connected device node; and
   responding to a determination that device data was not requested from the connected device node by performing the step of requesting device data from the connected device node.

8. A method in accordance with claim 1, further comprising a step of issuing a command to the first potentially-identifiable network device, wherein the command is selected from the set consisting of activating the network device, deactivating the network device, and requesting information from the network device.

9. A computer-readable storage medium storing a set of programmable instructions configured for being executed by at least one processor for performing a method for discovering one or more potentially-identifiable network devices, said method comprising:
   providing a data table having a plurality of device entries corresponding to the one or more potentially-identifiable network devices;
   initializing the data table by populating the plurality of device entries with one or more of known device data and generic device data;
   requesting a connected node list from at least a first of the one or more potentially-identifiable network devices, wherein the connected node list identifies at least one connected device node capable of communicating with said first potentially-identifiable network device;
   flagging as potentially found the device entry corresponding to the connected device node;
   requesting device data from the connected device node corresponding to the flagged device entry;
   determining whether or not a response to the device data request is received and whether the response to the device data request is complete or partial, wherein if the response to the device data request is partial, requesting and receiving additional device data from the connected device node;
   populating the flagged device entry with received device data and/or received additional device data if the response to device data request and/or additional device data request is received; and
   nullifying the flagged device entry if the response to the device data request is not received.

10. A home automation network, comprising:
    at least one network device node;

a home automation network interface, the home automation network interface configured to communicate with the at least one network device node; and a processor operably coupled to the home automation network interface configured to execute a set of programmable instructions for performing a method for discovering one or more potentially-identifiable network devices, said method comprising:

providing a data table having a plurality of device entries corresponding to the one or more potentially-identifiable network devices;

initializing the data table by populating the plurality of device entries with one or more of known device data and generic device data;

requesting a connected node list from at least a first of the one or more potentially-identifiable network devices, wherein the connected node list identifies at least one connected device node capable of communicating with said first potentially-identifiable network device;

flagging as potentially found the device entry corresponding to the connected device node;

requesting device data from the connected device node corresponding to the flagged device entry;

determining whether or not a response to the device data request is received and whether the response to the device data request is complete or partial, wherein if the response to the device data request is partial, requesting and receiving additional device data from the connected device node;

populating the flagged device entry with received device data and/or received additional device data if the response to device data request and/or received additional device data request is received; and nullifying the flagged device entry if the response to the device data request is not received.

11. A home automation network discovery apparatus, comprising:

a processor configured to execute a set of programmable instructions for performing a method for discovering one or more potentially-identifiable network devices, said method comprising:

providing a data table having a plurality of device entries corresponding to the one or more potentially-identifiable network devices;

initializing the data table by populating the plurality of device entries with one or more of known device data and generic device data;

requesting a connected node list from at least a first of the one or more potentially-identifiable network devices, wherein the connected node list identifies at least one connected device node capable of communicating with said first potentially-identifiable network device;

flagging as potentially found the device entry corresponding to the connected device node;

requesting device data from the connected device node corresponding to the flagged device entry;

determining whether or not a response to the device data request is received;

populating the flagged device entry with received device data and/or received additional device data if the response to device data request and/or received additional device data request is received; and nullifying the flagged device entry if the response to the device data request is not received.

12. The apparatus in accordance with claim 11, further comprising:

a home automation network interface operably coupled to the processor, wherein the home automation network interface is configured to communicate with a home automation network.

* * * * *